Dec. 4, 1945.  R. A. L. SELIGMAN  2,390,183
STAMPING DIE
Filed Dec. 6, 1940
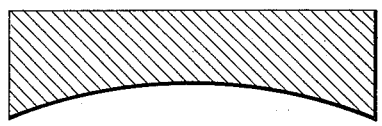
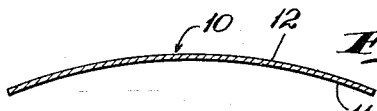
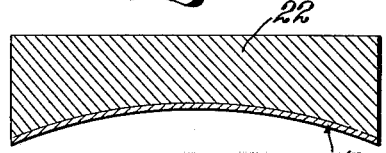
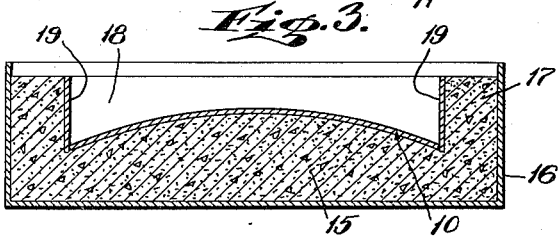
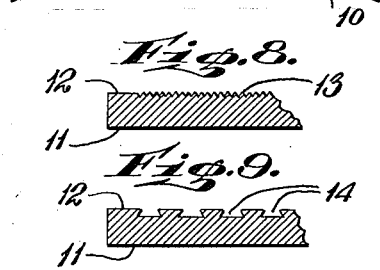
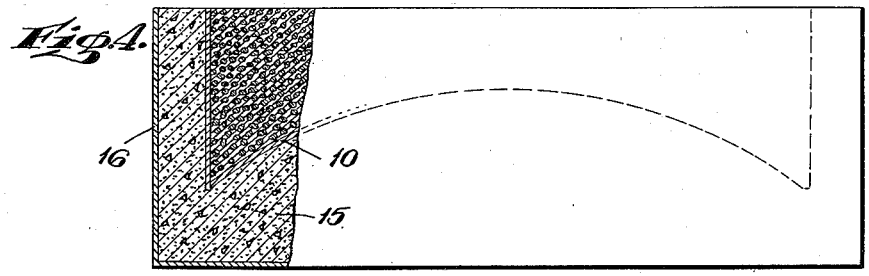
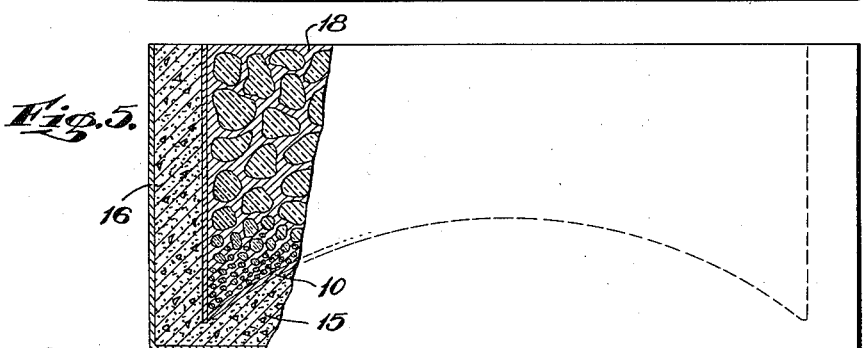
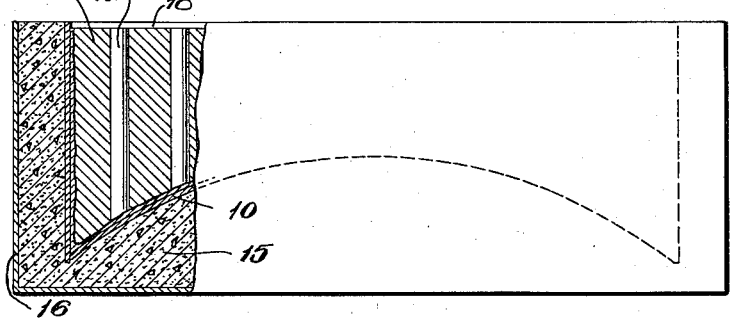
INVENTOR
Roger A. L. Seligman
BY Kenyon & Kenyon
ATTORNEYS.

Patented Dec. 4, 1945

2,390,183

UNITED STATES PATENT OFFICE 2,390,183

STAMPING DIE

Roger Adolphe Leonard Seligman, Paris, France; vested in the Alien Property Custodian Application December 6, 1940, Serial No. 368,873

15 Claims. (Cl. 76—107)

This invention relates to a method of making stamping dies, more particularly dies used in the stamping of sheet metal forms of any kind, large or small, and to the novel stamping die so made.

It has long been known that the making of dies for sheet metal stamping, particularly in the larger sizes, is a long and tedious task. The metal of which the die is to be made must be exceedingly hard, and accordingly, requires the use of cutting tools of even greater hardness, for example tungsten carbide, in order to machine the same. Often, in the case of deeply recessed dies, a comparatively large amount of metal must be removed in the machining operation, and the task of establishing the desired surface, and producing thereon the requisite smoothness or polish, is exacting work and is both expensive and time-consuming. An important part of the expense and delay in the manufacture of new styles of automobile bodies, duralumin plates for the airfoil surfaces of airplane wings, and the like, is attributable to the time and expense necessary in machining the dies between which such shapes are stamped from sheet stock.

The object of the present invention is to enable stamping dies to be made cheaply and comparatively rapidly having a hardened working surface of any desired configuration and substantial hardness at least in that part of the backing material which lies immediately behind the hardened working face.

According to one form of the present invention, one or more steel sheets of a suitable thickness and having at least one face sufficiently smooth to serve as the working face of the required die, are bent or welded or otherwise joined together to the desired shape and temporarily secured in that shape by any suitable means such, for example, as by pouring a temporary concrete form against its smooth face. Thereafter the space behind the plate, which is to constitute the body portion of the die, is built up with a mixture of metallic particles or fragments, said mixture comprising at least one metal or metallic alloy whose melting point is not higher than the temperature at which hardening of the steel face plate can be accomplished (having regard to the particular character of the steel of which the face plate is made), and then compressing together the face plate and the mixture of solid particles behind it at that temperature which will melt the metallic component of the mixture behind the face plate causing said mixture to become fluid while said temperature is maintained, said temperature being also that which will accomplish a hardening of the face plate. Thereafter the mass is cooled in whatever manner is most appropriate to secure and maintain the maximum degree of hardness of the face plate and such cooling solidifies the previously fluid mass in the backing portion into a solid metallic mass. The cement or concrete which serves as a temporary form may be removed before or after cooling, as desired, and the die, after such incidental dressing as may be necessary, is ready for use.

Referring to the drawing annexed to and forming a part of this specification—

Fig. 1 is a cross section of a female die having a concave working surface, as now in common use, machined out of a single block of hardened steel.

Fig. 2 shows in cross section a steel plate bent so that its concave face corresponds exactly to the shape of the concave working face of the die shown in Fig. 1.

Fig. 3 shows in cross section the said plate mounted upon a temporary concrete form with its working face positioned against the concrete, and with temporary side wall members adapted to retain a mass of backing material or fragments thereafter to be placed in position against the back of the plate.

Fig. 4 shows in somewhat larger scale and partly in section and partly in side elevation the space behind the facing plate filled with a mixture of solid particles, hereinafter more particularly described.

Figs. 5 and 6 are similar to Fig. 4, but differ therefrom in showing different materials used for filling in the space behind the plate as hereinafter set forth.

Fig. 7 shows in cross section a finished stamping die made according to this invention.

Figs. 8 and 9 show in still further enlarged scale and in cross section various means which may be used to improve the adherence between the face plate and the backing material, as hereinafter described.

Referring to the drawing, wherein like reference characters refer to like parts—

In Fig. 1 there is shown a form of female stamping die which might be used, for example, in shaping a duralumin plate for a part of an airplane wing. Such die is employed in a heavy press and in conjunction with a male die of complementary shape. The particular shape shown has been selected merely for illustration and it will be understood that the invention applies equally to the making of the complementary male die. While the invention here described applies to the making of a stamping die of any desired face shape which can be achieved by the bending or working of a thin plate of steel or equivalent metal, the invention will be here described in connection with the manufacture of a die similar to that shown in Fig. 1.

According to the present invention, a sheet of steel or other equivalent hard metal of relatively high melting point which is not too brittle to be bent to the desired shape and which has a critical temperature of hardening within a suitable range, is bent in such manner that one of its faces is made to assume the desired configuration of the die to be made. The thickness of the plate is not of critical importance so long as it may be bent or worked to the desired configuration. For purposes of illustration, a plate 1 cm. in thickness may be used. Referring to Figs. 2 to 7, inclusive, a sheet of steel 10 having one face thereof sufficiently smooth to serve as the working face of the die, is bent to the required shape. The working face 11 thereof is preferably a polished surface, and it is one of the advantages of this invention that the polish can be given to this surface of the plate before bending and while the same is flat. The opposite face 12 of the plate 10 should preferably not be polished. It may be left as it comes from the rolling mill or it may be artificially roughened in any desired manner to improve its capacity to bond with the backing material. One method of such roughening may be to score grooves 13 therein (see Figure 8) by the use of any suitable sharp tool; another may be to cut grooves 14 therein having undercut edges (see Figure 9); other methods of roughening the surface in order to improve the quality of the bond may be employed.

Plate 10, after having been bent to the desired shape, is then temporarily supported in that shape upon a form of poured concrete or cement 15 contained in a suitable mold 16. The concrete is allowed to harden in contact with the smooth working face 11 of the plate and care is taken that the concrete is sufficiently in contact with the plate so that deformation of the latter does not occur in subsequent stages of the process. If desired, hard dry sand may be used where it is supported in a mold in such manner as to withstand sufficiently the pressures involved.

The concrete form is made with side walls 17 projecting upwardly to a suitable height at the edges of the plate, forming a continuous wall surrounding the plate and defining the edges thereof, and forming a space 18 which is afterwards to be filled with backing material. If desired edge-facing plates of steel 19 may be inserted to define the marginal boundaries of the space 18.

Within the space 18 is placed a material, or a mixture of materials, which when properly hardened in place will afford a suitable backing for the face plate 10. Such material may be either a metal or an alloy of metals or a mixture of different metals or of different alloys, one of these being herein referred to as the fusing component. At least one of the metals or alloys present is the fusing component, and this should be capable of melting at a temperature not higher than the highest temperature to which the face plate 10 can be raised in the course of hardening of its surface by heat treatment. For example, if the face plate 10 be of steel which hardens by quenching after being heated to about 810° C., there may be used as the fusing component of the material placed in space 18 a metal or an alloy which has a melting point below 810° C. On the other hand, the steel mentioned may be safely heated to temperatures substantially higher than 810° C. and hardness may be attained by quenching from above that figure if the stages of cooling from the highest temperature to about 810° are very gradual, as is well known. Thus, there may be used, as the fusing component of the backing material placed in space 18, alloys whose melting points are substantially higher than 810° C., but in such cases the subsequent stages of cooling must be carried out in such manner as to retain the desired hardness of the steel facing plate. The fusing component should, preferably, be an alloy of aluminum or copper having a melting point substantially less than 1000° C.

*Example 1.*—If the face plate is a steel having a critical temperature of crystalline conversion about 750° C., the material placed in the space 18 may consist of a mixture of iron or steel fragments and powdered duralumin in the proportions of approximately 90% by weight of iron particles and 10% by weight of duralumin in the form of a finely divided powder. If the duralumin used has the composition of about 4% copper, 0.5% magnesium, 0.7% manganese, and the rest aluminum, then the melting point thereof will be about 655° C. Accordingly, upon the subsequent heating, the temperature should be brought to about 750° C. and at this temperature the duralumin powder will melt and form a continuous metallic matrix within the space 18 containing in suspension iron fragments which, at the temperature indicated, will, of course, not melt. Subsequent quenching from this temperature is then carried out in such manner as to bring about the desired hardening of the face plate 10.

*Example 2.*—If the face plate 10 is a steel whose maximum hardness can be achieved and not lost by elevation of the temperature to 925° C. provided the temperature is then reduced slowly and without too rapid cooling to about 810° C., then the material placed in the space 18 may consist of a mixture of iron fragments with finely powdered aluminum bronze alloy in about the proportions previously stated. Preferably that form of aluminum bronze alloy is used which is known as "A No. 1," consisting of 89% copper and 11% aluminum, and has a melting point of about 925° C. The use of aluminum bronze alloy is suggested because upon solidifying this alloy is exceedingly tough and resistant to compression. When using the aluminum bronze alloy, the material is then heated to a temperature which is high enough to melt the powdered alloy and to cause the material within space 18 to fuse so that the alloy becomes a matrix of continuous phase. Because of the necessity of carrying the temperature of heating to about 925° C., in order to fuse the alloy, it then becomes necessary in order that the plate 10 shall regain its hardness, to cool the mass in the manner well understood in the art of hardening steel plates.

*Example 3.*—Instead of the aluminum bronze alloy mentioned in the preceding example, there may be used an alloy of aluminum or copper or both with added metallic arsenic or silicon. Such an alloy, depending on the percentage of arsenic or silicon present, will have a linear coefficient of expansion more nearly equal to that of steel. Thus, by using an alloy containing a desired percentage of a metal having the effect of reducing the linear coefficient of expansion, the fusing component of the backing material will contract in cooling substantially or sufficiently equally to the contraction of the steel facing plate, thus reducing the possibility of deformation of the facing plate due to unequal contraction during cooling.

*Example 4.*—The material placed in space 18 may comprise a mixture of the low-melting alloy, such, for instance, as one of the alloys mentioned in the previous examples, with fragments of any hard material, metallic or non-metallic, having a substantially higher melting point. The size of these fragments may vary within wide limits from particles that will pass through a comparatively fine mesh screen to large fragments or blocks, as set forth in Example 5 below. Preferably, fragments of iron or steel are used because it is not necessary that all the material introduced into space 18 shall melt and because at the temperatures used the iron fragments will tend to harden and anneal, but any other hard material or alloy, or any hard non-metallic substance of sufficient resistance to deformation by crushing, may be used. According to one form of this invention, these fragments may be of graduated size, as indicated in Fig. 5, with the smaller fragments preferably positioned in closest proximity to plate 10 and the coarser fragments further removed therefrom. In this way, particularly where using a low-melting alloy of metal which in itself is not as hard as may be desired, greater resistance to deformation may be obtained within the area close behind the face plate 10.

*Example 5.*—Within the space 18 may be inserted a block 20 of cast iron, roughly but not accurately cut to the approximate internal shape of the space 18. Through this block may be drilled holes 21, penetrating the same from top to bottom. This form of the invention may be regarded as the limit case in which the material of high melting point, instead of being introduced in the form of many small fragments or a smaller number of large fragments, is now introduced in the form of a single large fragment or block. In this example the metal or alloy of relatively low melting point may be sprinkled upon the surface 12 of the plate before the block 20 is put in position and in addition introduced in powder form through the holes 21 and inserted around the edges.

*Example 6.*—The material with which the space 18 is filled may be introduced in molten form at a temperature not in excess of the temperature to which the steel plate 10 can be heated in the course of hardening. In such case the molten metal added may consist wholly of a metal or alloy which melts at or below that temperature, such as one of the alloys mentioned in Examples 1, 2 or 3, or it may consist of such metal or alloy in molten form carrying in suspension fragments of solid matter such as fragments of iron, which are solid at that temperature, or such alloy or metal in molten form may be poured upon a mass of solid fragments filling the space 18 and preferably after such particles have been heated so that the added molten metal will remain in fluid form until it has fully penetrated the interstices between the fragments, especially in the area adjacent plate 10, or such molten alloy or metal may be fed under pressure through hole 21 in a solid block of metal 20, in which case one or more of the holes 21 may be used for the feeding of the hot metal and the other holes 21 may be filled with sand to permit escape of the displaced air.

Where in any of the foregoing examples it is proposed to use a mixture of metallic fragments with a metal of lower melting point, it will be understood that no substantial alloying of the two metals will occur at the temperatures employed and that in the finished die the two metals exist separately without a substantial degree of amalgamation.

After the space 18 has been filled in any one of the manners suggested, the plate and its backing are then heated to, or maintained at, a temperature which is sufficient to assure proper fusing of the alloy or metal in the space 18 which has the relatively low melting point, and such temperature is maintained until space 18 has been solidly filled (and air is sufficiently eliminated) to such depth as to assure adequate and solid backing for the plate 10.

If desired, before the heating, or during the early stages of cooling, or both, the mass of material within space 18 may be compressed in any suitable manner. For example, the mold 16 with all of its contents may be placed in a press and a flat stamping die may then be brought down into contact with the upper surface of the material in space 18 and the whole may then be placed under substantial pressure in order to homogenize the material within space 18.

While the temperature is maintained the mass of backing material bonds sufficiently to the plate 10 so that the same will be firmly held when the die is cool.

After cooling, the temporary mold 16 and the temporary concrete form 15 are cut away. The result is a stamping die as shown in Fig. 7, having the desired shape in its working face and being of compound structure comprising the steel plate 10 and the hardened backing material 22 consisting of a homogeneous mass having a continuous metallic phase and preferably containing one or more fragments of hard material having a melting point substantially higher than the temperatures at which the die was formed.

Accordingly, the process of this invention is adapted to accomplish simultaneously (a) the formation of a hard homogeneous metallic mass behind the working face of the die and supporting the same, and (b) the hardening of the steel plate forming the working face of the die, both results being accomplished in a single stage of treatment by reason of the relationship between the melting point of the fluxing metal and the critical temperature of molecular rearrangement of the plate which forms the working face of the die, and the product of this invention is the article so made.

Certain types of steels which may be used for the facing plate of this invention may require or permit the hardening thereof by successive steps of heating, quenching, aging, reheating, gradual cooling, and the like, as is well understood in the art. It may be desirable when using certain steels, to perform some but not all of these steps before the backing material is applied to the plate. In that case, it will be understood that the remaining steps by which the desired hardness of the plate is secured or maintained may be carried out after the backing material has been applied in accordance with this invention.

I claim:

1. The method of making a shaped stamping die having a hardened steel working face which includes forming a steel plate to the desired face shape, filling the space adjacent the back of said plate with backing material composed in part at least of a metallic fusing component whose melting point is not higher than the highest temperature to which the steel of the plate may be raised without detriment to the subsequent hardening of said steel by quenching, heating said backing material and steel plate to a temperature high enough to melt the fusing component but not higher than the highest temperature to which the steel can be raised without detriment to the subsequent hardening thereof by quenching, and then cooling the backing material and steel plate together in such manner including quenching as to harden the plate.

2. The method of making a shaped stamping die having a hardened steel working face which includes forming a steel plate to the desired face shape, compressing against the back of said plate a mass of particles including in powdered form a metal whose melting point is not higher than the highest temperature to which the steel of the plate may be raised without detriment to the subsequent hardening of said steel by quenching, heating said mass of particles and the steel plate to a temperature high enough to melt the said powdered metal but not higher than the highest temperature to which the steel can be raised without detriment to the subsequent hardening thereof by quenching, and then cooling the said mass and the said steel plate together in such manner including quenching as to harden the plate.

3. The method of making a shaped stamping die having a hardened steel working face which includes forming a steel plate to the desired face shape, filling the space adjacent the back of said plate with backing material composed in part at least of a metallic alloy, said alloy having a melting point not higher than the highest temperature to which the steel of the plate may be raised without detriment to the subsequent hardening of said steel by quenching, said alloy also including a metal selected from the group comprising arsenic and silicon sufficient to cause said backing material to possess a coefficient of linear expansion approximately equal to that of the steel in said plate, heating said backing material and steel plate to a temperature high enough to melt said alloy but not higher than the highest temperature to which the steel can be raised without detriment to the subsequent hardening thereof by quenching, and then cooling the backing material and steel plate together in such manner including quenching as to harden the plate.

4. A shaped stamping die having a facing element of steel hardened by quenching from a temperature not less than its temperature of crystalline conversion and a backing element bonded to the facing element, said backing element containing sufficient duralumin to endow the backing element with a coefficient of expansion similar to that of the steel facing element.

5. A shaped stamping die having a facing element of steel hardened by quenching from a temperature not less than its temperature of crystalline conversion and a backing element bonded to the facing element, said backing element containing sufficient aluminum bronze alloy to endow the backing element with a coefficient of expansion similar to that of the steel facing element.

6. A shaped stamping die having a facing element of hardened steel and a backing element bonded to the facing element, said backing element being resistant to deformation under heavy pressure and being composed at least in part of an alloy containing sufficient arsenic to impart to the backing element a coefficient of linear expansion approximately equal to that of the steel in the facing element.

7. A shaped stamping die having a facing element of hardened steel and a backing element bonded to the facing element, said backing element being resistant to deformation under heavy pressure and being composed at least in part of an alloy containing sufficient silicon to impart to the backing element a coefficient of linear expansion approximately equal to that of the steel in the facing element.

8. A stamping die comprising a facing element of steel hardened by quenching from a temperature not less than its temperature of crystalline conversion and a metallic backing element bonded to the facing element, said backing element consisting of a mass composed principally of hard metal material resistant to deformation under heavy pressure and non-fusible at the said temperature and fusible metal bonding the backing element through having been fused thereon on the facing element at a temperature not higher than the temperature of crystalline conversion of the steel facing element, said hard metal material and said fusible metal being present in proportions endowing said backing element with a coefficient of linear expansion similar to that of the steel facing element.

9. A stamping die comprising a relatively thin steel plate having a hardened working face and a compression resistant non-steel metallic backing fused thereon, said metallic backing consisting of a mass of hard relatively non-fusible metal having substantially the same coefficient of expansion as the steel plate and high compression strength, said mass further containing other metal fused at a temperature not higher than the temperature of crystalline conversion of the steel plate conditioning hardening of the steel plate by quenching, in a manner effecting coherence in the mass and fusion thereof to the steel plate.

10. A stamping die according to claim 8 wherein said fusible metal comprises duralumin.

11. A stamping die according to claim 8 wherein said fusible metal comprises aluminum bronze alloy.

12. A shaped stamping die having a facing element of steel hardened by quenching from a temperature not less than its temperature of crystalline conversion and a backing element bonded to the facing element, said backing element being composed of material resistant to deformation under heavy pressure and containing metal and having a melting point not higher than the highest temperature to which the steel of the facing element may be raised without detriment to the subsequent hardening of the steel by quenching, sufficient of the metal being present to endow the material of the backing element with a coefficient of expansion similar to that of the steel facing element.

13. In a stamping die, a shaped facing element of hardened steel and a backing element on the facing element consisting of a formed body of material resistant to deformation under high pressure, said material comprising pieces of iron relatively infusible at the temperature of crystalline conversion of the steel of the facing element, and other relatively hard metal fusible at a temperature not higher than said temperature of crystalline conversion, said other metal fusing the pieces of iron together and fusing said body to the facing element and endowing said backing element with a coefficient of expansion similar to that of the steel of the facing element.

14. In a stamping die, a shaped facing element of hardened steel and a backing element on the facing element consisting of a formed body of material resistant to deformation under heavy pressure, said material comprising pieces of steel relatively infusible at the temperature of crystalline conversion of the steel of the facing element, and other relatively hard metal fusible at a temperature not higher than said temperature of crystalline conversion, said other metal fusing the pieces of steel together and to the backing element and endowing said backing element with a coefficient of expansion similar to that of the facing element.

15. In a stamping die, a shaped facing element of hardened steel and a backing element on the facing element consisting of a block of iron resistant to deformation under heavy pressure, and infusible at the temperature of crystalline conversion of the steel of the facing element, said block being provided with perforations extending therethrough, and other relatively hard metal fusible at a temperature not higher than the temperature of crystalline conversion of the steel of the facing element, said other metal being fused in and at least partially filling said perforations in contact with said facing element and fusing said block to the facing element and endowing said backing element with a coefficient of expansion similar to that of the facing element.

ROGER ADOLPHE LEONARD SELIGMAN.